Patented Dec. 17, 1929

1,739,566

UNITED STATES PATENT OFFICE

EDUARD SALOMON ALI-COHEN, OF THE HAGUE, NETHERLANDS

MANUFACTURE FROM LATEX OF AN ARTIFICIAL GUTTA-PERCHA AND A NONHYGROSCOPIC RUBBER

No Drawing. Application filed September 10, 1928, Serial No. 305,129, and in the Netherlands January 20, 1927.

This invention relates to the manufacture from rubber latex of a substitute for gutta-percha as well as non-hygroscopic rubber. Aluminium soap and one or more resins and one or more waxes are used in the process.

According to the invention an emulsion of one or more resins and one or more waxes in a soap solution is made, and mixed with latex, the mixture being then coagulated with an aluminium salt, particularly with aluminium sulphate or alum.

The emulsion of resin and wax in an alkali or ammoniacal soap solution is preferably mixed with diluted latex while being heated (to boiling point) and is then coagulated with alum.

Given a sufficient content of resin and wax and aluminium soap, the resulting product forms an excellent substitute for gutta-percha.

In order to obtain a gutta-percha-substitute it is necessary to use a considerable quantity of resin and wax, for instance, more than 100% of the rubber in the coagulated product, while the quantity of aluminium soap in the coagulum must amount to at least 15% of the rubber.

The coagulum obtained is easier to wash out than coagulated rubber, less sticky, more repellant to water, better adapted to withstand extremes of temperature and much tougher and stronger than rubber.

The quantity of aluminium sulphate with which coagulation is effected should preferably be such that, having regard to the quantity of alkali soap present, the mixture gives an acid reaction. The term "soaps" is intended to embrace the salts of the higher fatty acids, such as stearic acid, palmitic acid and the like or of resin acids, such as colophony; also the soaps which are derived from castor oil, Turkey red oil and other sulphonated oils including those of mineral origin.

It is obvious that, prior to coagulation with alum or aluminium sulphate, fillers may be introduced into the mixture.

*Example.*—A solution is made of 500 g. of white soap in 5000 c. c. of water. To the boiling solution is added a little strong sodium hydroxide and then 500-250 g. of colophony, 100-500 g. of shellac and 500 g. of beeswax are stirred in. The whole is thoroughly stirred until a homogeneous emulsion is obtained.

1500 c. c. of rubber latex, containing 540 g. of dry rubber, are now diluted with about 3 litres of water and the diluted latex is added, warm, to the warm resin-soap emulsion and well stirred.

Coagulation is now effected with a 5% alum solution, containing 350 g. of crystallized alum.

There is obtained a fine-grained coagulum which is lixiviated in hot water until a neutral reaction is obtained. It is then pressed out between hot rollers, by which process a sheet is formed which is dried afterwards.

The mass so obtained has physical and electrical properties corresponding exactly to those of gutta-percha, but it is much cheaper.

Instead of colophony and shellac, other resins may be employed and other waxes may be used instead of beeswax. Ammoniacal soap may be used in place of an alkali soap.

An important advantage of the new product is that it is very repellant to water, so that it readily loses its moisture, and, in contradistinction to all known rubber mixtures, it does not again take up moisture when in use. Consequently, it provides an insulating material of outstanding merit and in nowise inferior to gutta-percha itself.

The properties which render this product valuable as a substitute for gutta-percha must probably be ascribed to the high content of aluminium soap wherein are chemically combined the considerable quantities of resin and wax.

If the proper mixing proportions are not adhered to, there results a rubber product which is less satisfactory as a gutta-percha-substitute but is, nevertheless, repellant to water and possesses outstanding technical and electrical properties.

What I claim is:—

1. A process of manufacturing rubber preparations, comprising the steps of preparing a solution of white soap; stirring colophony, shellac and beeswax therein to form an emulsion; mixing latex with the emulsion; and adding an alum solution to the mixture to coagulate the same.

2. A process according to claim 1, in which a small amount of sodium hydroxide is added to the soap solution before the addition of the colophony, shellac and beeswax to maintain the mass in a liquid state.

3. A process of manufacturing rubber preparations, comprising the steps of preparing a hot homogeneous emulsion of resins and waxes in an alkali soap solution; adding diluted latex thereto; and coagulating with a soluble aluminium salt.

4. A process according to claim 3, in which the coagulated product contains an amount of aluminium soap produced by interaction of the soap solution and the soluble aluminium salt greater than 15% of the rubber therein.

5. A process according to claim 3, in which the coagulated product contains an amount of resins and waxes greater than 100% of the rubber therein.

6. A process of manufacturing rubber preparations, comprising the steps of preparing a hot homogeneous emulsion of resin and wax in a soap solution; adding diluted latex; and then adding a solution of a coagulating soluble aluminium salt in such proportions that the coagulated product contains an amount of aluminium soap produced by the interaction of the soap solution and the soluble aluminium salt greater than 15% of the rubber therein, and that the amount of resin and wax is greater than 100% of the rubber therein.

7. As a new article of manufacture, a homogeneous compound of more than 100 parts of wax and a resinous substance, 100 parts of rubber and more than 15 parts of aluminium soap.

In testimony whereof I affix my signature.

EDUARD SALOMON ALI-COHEN.